United States Patent
Shimosato (10) Patent No.: US 10,397,870 B2
(45) Date of Patent: Aug. 27, 2019

(54) ELECTRONIC DEVICE THAT PERFORMS INDICATION ON A DISPLAY WHEN A WIRELESS CONNECTION WITH AN EXTERNAL DEVICE IS DISCONNECTED

(71) Applicant: CANON KABUSHIKI KAISHA, Tokyo (JP)

(72) Inventor: Jiro Shimosato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/689,178

(22) Filed: Aug. 29, 2017

(65) Prior Publication Data

US 2018/0063790 A1  Mar. 1, 2018

(30) Foreign Application Priority Data

Aug. 31, 2016 (JP) .................................. 2016-170065

(51) Int. Cl.
| | | |
|---|---|---|
| G08B 1/08 | (2006.01) | |
| H04B 7/26 | (2006.01) | |
| G08C 17/02 | (2006.01) | |
| H04L 12/12 | (2006.01) | |
| H04W 52/02 | (2009.01) | |
| H04W 76/11 | (2018.01) | |

(52) U.S. Cl.
CPC .......... *H04W 52/0229* (2013.01); *G08B 1/08* (2013.01); *G08C 17/02* (2013.01); *H04B 7/2612* (2013.01); *H04L 12/12* (2013.01); *H04W 52/0251* (2013.01); *H04W 52/0254* (2013.01); *H04W 76/11* (2018.02); *Y02D 70/00* (2018.01); *Y02D 70/1262* (2018.01); *Y02D 70/142* (2018.01); *Y02D 70/144* (2018.01); *Y02D 70/20* (2018.01); *Y02D 70/26* (2018.01); *Y02D 70/449* (2018.01)

(58) Field of Classification Search
CPC ......... H04N 5/23293; H04N 5/232939; H04N 5/232941; H04W 52/0229; H04W 52/0254; H04W 76/021; H04W 76/11; H04W 52/0251; H04B 7/2612; G08B 1/08; H04L 12/12; G08C 17/02; Y02D 70/1262; Y02D 70/449; Y02D 70/142; Y02D 70/144; Y02D 70/26; Y02D 70/00; Y02D 70/20
See application file for complete search history.

(56) References Cited

U.S. PATENT DOCUMENTS

| | | | |
|---|---|---|---|
| 9,363,757 B2 | 6/2016 | Takahashi et al. | |
| 2006/0111097 A1* | 5/2006 | Fujii | ....................... H04L 63/08 455/420 |
| 2007/0120955 A1* | 5/2007 | Shimosato | ....... H04N 21/44227 348/14.01 |

(Continued)

FOREIGN PATENT DOCUMENTS

JP  2015180043 A  10/2015

*Primary Examiner* — Luong T Nguyen
(74) *Attorney, Agent, or Firm* — Venable LLP (57) ABSTRACT

If a wireless connection with an external device is disconnected, it is determined whether or not the disconnection is based on a request from the external device. Different methods for displaying a screen indicating the disconnection are used in the case where it is determined that the disconnection is based on a request from the external device and the case where it is not. Accordingly, it is possible to realize an electronic device that performs suitable indication to a user and a method for controlling the same.

9 Claims, 9 Drawing Sheets

(56) References Cited

U.S. PATENT DOCUMENTS

| | | | |
|---|---|---|---|
| 2007/0282978 A1* | 12/2007 | Fukushima | G06F 13/4081 709/218 |
| 2015/0146242 A1* | 5/2015 | Tsujimoto | H04N 1/00233 358/1.15 |
| 2015/0245298 A1* | 8/2015 | Takahashi | H04W 52/0254 455/574 |
| 2016/0249291 A1 | 8/2016 | Takahashi et al. | |

* cited by examiner

ELECTRONIC DEVICE THAT PERFORMS INDICATION ON A DISPLAY WHEN A WIRELESS CONNECTION WITH AN EXTERNAL DEVICE IS DISCONNECTED

BACKGROUND OF THE INVENTION

Field of the Invention

The present invention relates to an electronic device and a method for controlling the same, and in particular relates to an electronic device that has a wireless communication function, and a method for controlling the same.

Description of the Related Art

Currently, there exist various wireless communication standards (wireless network environments) with different communication ranges, communication speeds, power consumption, and the like, and there also exist electronic devices corresponding to multiple wireless network environments (Japanese Patent Laid-Open No. 2015-180043).

Wireless communication between an electronic device and an external device is started through an operation of the electronic device in some cases, and is started (without an operation of the electronic device) due to a request from the external device (e.g., through other wireless communication) in some cases. Also, the wireless communication between the electronic device and the external device is disconnected in some cases due to deterioration of the communication environment, an operation of the electronic device, or a request from the external device.

In the case where the electronic device and the external device are performing wireless communication, the users of the electronic device and the external device are not necessarily the same person, and there is a possibility that they are at separate locations. For this reason, if the wireless communication between the electronic device and the external device is disconnected, a message is displayed on the display unit of the electronic device regardless of how the wireless communication was started and regardless of the cause of the disconnection, and user confirmation (e.g., a press of an "OK" button) is requested.

In the above-described example, even if the wireless communication between the electronic device, which is located in a bag, and the external device, which is held in a hand, for example, is started or disconnected due to a request from the external device, the message continues to be displayed on the electronic device until the user confirmation is obtained. For this reason, the user needs to take out the electronic device and operate it in order to confirm the message, which is complicated.

SUMMARY OF THE INVENTION

The prevent invention was made in view of the problems with the conventional techniques, such as the example above, and provides an electronic apparatus that performs suitable indication to a user when a wireless connection with an external device is disconnected, and a method for controlling the same.

According to an aspect of the present invention, there is provided an electronic device comprising: at least one processor; a first wireless communication interface coupled to the at least one processor; wherein the at least one processor is configured to function as following units; a first determination unit configured to, if a connection with an external device through the first wireless communication interface is disconnected, determine whether or not the disconnection is based on a request from the external device; and a display control unit configured to display a screen for indicating the disconnection on a display unit, wherein the display control unit uses different methods for displaying the screen indicating the disconnection in a case in which it is determined that the disconnection is based on a request from the external device and in a case in which it is not determined that the disconnection is based on a request from the external device.

According to another aspect of the present invention, there is provided a control method for an electronic device having a wireless communication unit, the method comprising: determining, in a case where a connection with an external device performed by the wireless communication unit is disconnected, whether or not the disconnection is based on a request from the external device; and displaying a screen indicating the disconnection on a display apparatus, wherein in the displaying, different methods for displaying the screen indicating the disconnection are used in a case in which it is determined in the determining step that the disconnection is based on a request from the external device and a case in which it is not determined that the disconnection is based on a request from the external device.

According to a further aspect of the present invention, there is provided a non-transitory computer-readable medium storing a program for causing, when executed by a computer that is included in an electronic device having a first wireless communication unit, the computer to function as: a first determination unit configured to, if a connection with an external device through the first wireless communication unit is disconnected, determine whether or not the disconnection is based on a request from the external device; and a display control unit configured to display a screen for indicating the disconnection on a display unit, wherein the display control unit uses different methods for displaying the screen indicating the disconnection in a case in which it is determined that the disconnection is based on a request from the external device and in a case in which it is not determined that the disconnection is based on a request from the external device.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings. Note that in the following embodiment, a wireless communication system of a configuration using a digital camera serving as an example of an electronic device according to the present invention and a smartphone serving as an example of an external device will be described. However, an image capture function is not essential to the present invention, and the present invention is applicable to any electronic device that corresponds to multiple wireless network environments. This kind of electronic device encompasses but is not limited to digital cameras, smartphones, personal computers, tablet computers, media players, PDAs, game devices, smart watches, printers, and the like.

Configuration of Digital Camera

Figure 1A:
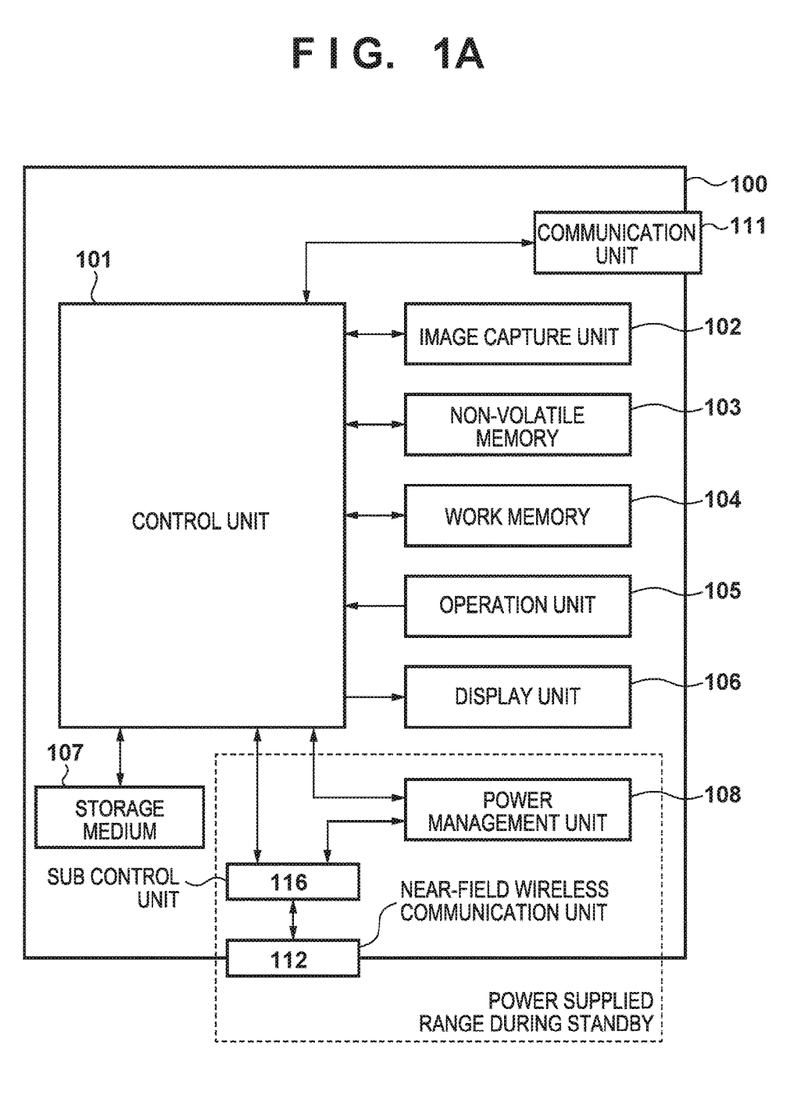
FIGS. 1A to 1C are diagrams relating to a digital camera, which is an example of an electronic device according to an embodiment.
Figure 1B:
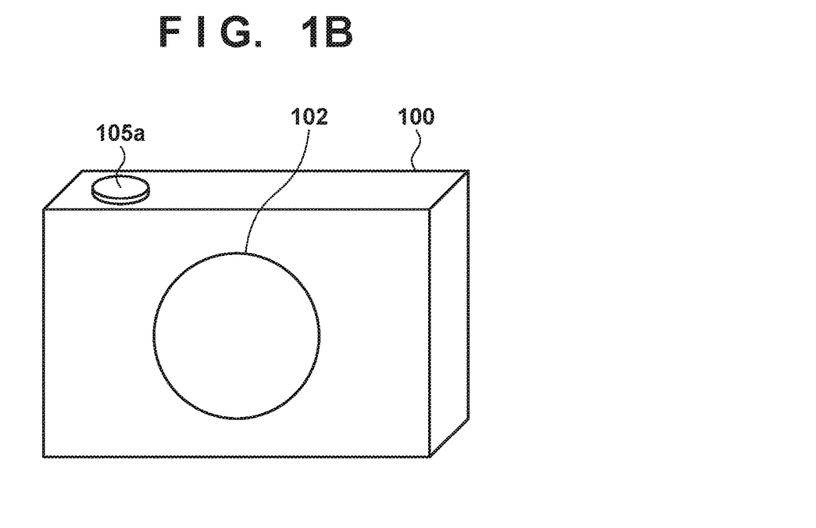
Figure 1C:
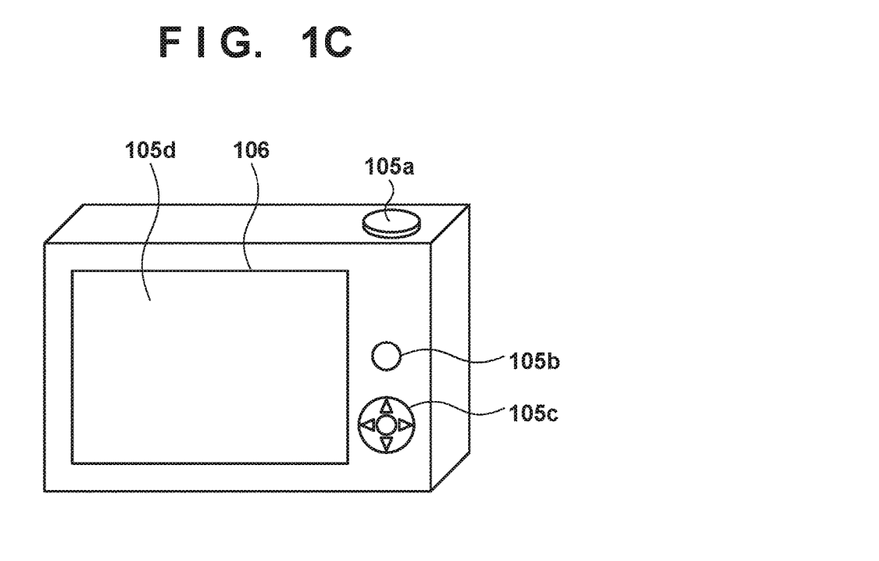

FIGS. 1A and 1B are diagrams relating to a digital camera 100, which is an example of an electronic device according to an embodiment of the present invention, FIG. 1A being a block diagram showing an example of a functional configuration, and FIGS. 1B and 1C being perspective views showing an example of an exterior.

The control unit 101 includes at least one programmable processor (hereinafter called "MPU" for the sake of convenience), for example. The control unit 101 realizes the various functions of the digital camera 100, such as communication with an external device, by executing a program stored in a non-volatile memory 103 using an MPU and controlling the units. Note that the control of the digital camera 100 does not need to be performed in a focused manner by the control unit 101, and the control may be performed in a dispersed manner by cooperating with a processor having other functional blocks.

For example, an image capture unit 102 includes a lens unit having a zoom lens, a focus lens, and a diaphragm, a controller (e.g., an MPU) that controls operation of the lens unit, an image sensor, and the like. The image sensor is a photoelectric conversion device that converts an optical image formed by a lens unit into a group of electric signals (pixel signals), and is commonly a CMOS (Complementary Metal Oxide Semiconductor) or CCD (Charge Coupled Device) image sensor. The image capture unit 102 includes a signal processing circuit for executing A/D conversion, noise reduction processing, and the like, and outputs a group of digital pixel signals (image data). Image data is processed in a manner similar to that of a common digital camera, and for example, is recorded in an image data file format in the storage medium 107, which is a memory card, is displayed on a display unit 106, or is output to an external device.

The non-volatile memory 103 can be electrically erased and recorded in, for example, and stores programs to be executed by the control unit 101, GUI data, various types of setting values, registration information (identification information, encryption keys for communication, etc.) for an external device, and the like.

A work memory 104 is used as a buffer memory that temporarily holds image data captured by the image capture unit 102, a display memory (VRAM) of the display unit 106, a work area for when the control unit 101 executes a program, and the like.

An operation unit 105 is a group of input devices by which the user inputs instructions to the digital camera 100. For example, the operation unit 105 includes a power button for giving an instruction to switch the power of the digital camera 100 on or off, a release switch for instructing the start of image capture preparation and the start of image capture, and a playback button for instructing playback (display) of image data. The operation unit 105 may also include a connection button for starting communication with an external device via the communication unit 111. In FIGS. 1B and 1C, a release switch 105a, a playback button 105b, direction keys 105c, and a touch panel 105d of the display unit 106 are input devices included in the operation unit 105.

Note that the release switch includes two switches, namely a switch SW1 that is turned on in a half-pressed state and a switch SW2 that is turned on in a fully-pressed state. The turning on of the switch SW1 is an image capture preparation start instruction, and the turning on of the switch SW2 is an image capture start instruction. Upon detecting an image capture preparation start instruction, the control unit 101 starts image capture preparation, such as AF (autofocus) processing, AE (auto-exposure) processing, AWB (auto-white balance) processing, and EF (pre-flash) processing. Also, when an image capture start instruction is detected, the control unit 101 starts image capture processing for recording, using the result of the processing carried out in the image capture preparation.

The display unit 106 performs display of a live view image and recorded images, display of a screen for an interactive operation, and the like. Note that the display unit 106 may be an external display apparatus of the digital camera 100.

The storage medium 107 is, for example, a semiconductor memory, and may be removable from the digital camera 100. Image files based on the image data output from the image capture unit 102 are stored in the storage medium 107.

The power management unit 108 manages power supplied from a power source such as a battery to the constituent elements of the digital camera 100. The power management unit 108 can supply power to the entirety of the digital camera 100 or supply power only to some constituent elements. Hereinafter, a state in which power is supplied to the entirety of the digital camera 100 will be called a power on state, a state in which power is supplied to only an sub control unit 116 and a short-range wireless communication unit 112 will be called a standby state, and a state in which power is not supplied to any of the constituent elements will be called a power off state. In the standby state, the digital camera 100 can keep the power consumption extremely low.

The communication unit 111 is a communication interface between the digital camera 100 and an external device, and is, for example, a wireless communication interface including an antenna, a modulation/demodulation circuit, and a communication controller. For example, the digital camera 100 can transmit image data obtained by the image capture unit 102 and image data stored in the storage medium 107 to the external device via the communication unit 111. Note that it is assumed that the communication unit 111 is a so-called wireless LAN interface, which conforms to the IEEE 802.11x standard, with an external device. Communication with an external device using the communication unit 111 is executed in accordance with control performed by the control unit 101.

The short-range wireless communication unit 112 is a wireless communication interface between the digital camera 100 and an external device, and for example, includes an antenna, a modulation/demodulation circuit, and a communication controller. The short-range wireless communication unit 112 performs wireless communication with smaller power consumption, a shorter communication range, and a slower communication speed than the communication unit 111 with the external device. For example, the short-range wireless communication unit 112 performs communication conforming to Bluetooth (registered trademark), and in particular, conforming to a Low Energy (BLE) standard of version 4.0 or later. Note that it is possible to use a configuration in which the communication unit 111 and the short-range wireless communication unit 112 perform communication conforming to another wireless communication standard.

Since the communication speed of the short-range wireless communication unit 112 is slower than the communication speed of the communication unit 111, it is basically used for communication of data with a relatively small capacity and data that is not likely to be affected by the communication speed, such as control information (commands), parameters, and the like. On the other hand, the wireless communication performed by the communication unit 111 is used to communicate data with a relatively large capacity and data that is likely to be affected by the communication speed (e.g., video data), as with transfer of image data.

Short-range wireless communication with an external device using the short-range wireless communication unit 112 is executed in accordance with control performed by the sub control unit 116. For example, the sub control unit 116 includes at least one programmable processor (MPU) and a memory and controls the operation of the short-range wireless communication unit 112 by executing a program stored in the memory using an MPU. The sub control unit 116 executes operations in accordance with commands received from an external device through the short-range wireless communication unit 112. These operations include changing control of the range of power supply performed by the power management unit 108 (e.g., changing from the standby state to the power on state), starting or stopping image capture performed by the image capture unit 102, switching to communication performed by the communication unit 111, and the like.

As stated above, since power is supplied to the short-range wireless communication unit 112 and the sub control unit 116 in the standby state as well, the digital camera 100 can communicate with the external device through the short-range wireless communication unit 112 in the standby state as well. Accordingly, it is possible to remotely change the digital camera 100 from the standby state to the power on state by transmitting a command for switching on the power to the digital camera 100 from the external device, for example.

Configuration of Smartphone

Figure 2A:
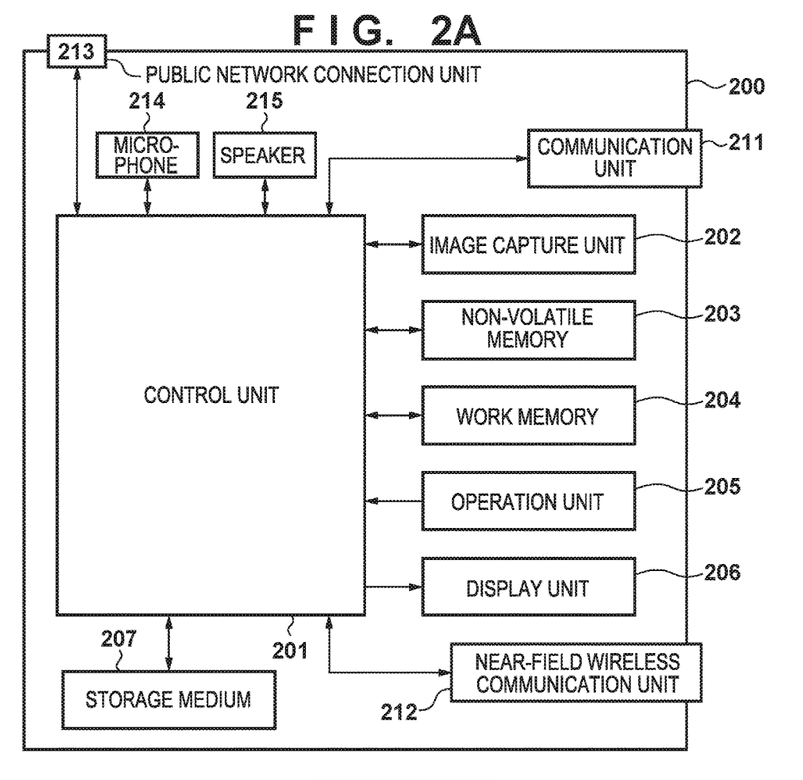
FIGS. 2A and 2B are diagrams relating to a smartphone, which is an example of an electronic device according to an embodiment.
Figure 2B:
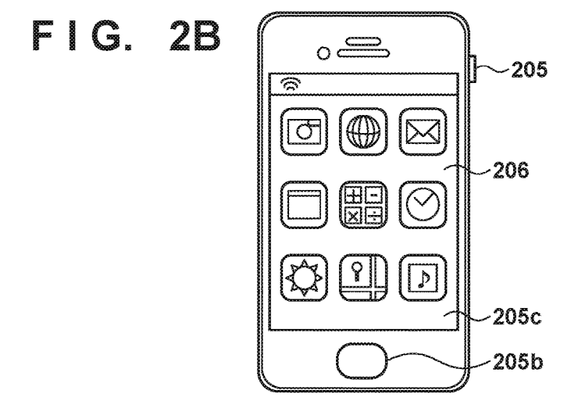

FIGS. 2A and 2B are diagrams relating to a smartphone 200 serving as an example of an electronic device that performs wireless communication with the digital camera 100, FIG. 2A being a block diagram showing an example of a functional configuration, and FIG. 2B being a front view showing an example of an exterior.

The control unit 201 includes at least one programmable processor (hereinafter called "MPU" for the sake of convenience), for example. The control unit 201 realizes the various functions of the smartphone 200, such as communication with an external device, by executing a program stored in a non-volatile memory 203 using an MPU and controlling the units. Note that the control of the smartphone 200 does not need to be performed in a focused manner by the control unit 201, and the control may be performed in a dispersed manner by cooperating with a processor having other functional blocks.

For example, the image capture unit 202 includes a lens unit having a focus lens and a diaphragm, a controller (e.g., an MPU) that controls the operation of the lens unit, an image sensor, and the like. The image capture unit 202 includes a signal processing circuit for executing A/D conversion, noise reduction processing, and the like, and outputs a group of digital pixel signals (image data). The image data is processed by the control unit 201 in a manner similar to that of a common digital camera, and for example, the image data is stored in an image data file format in the storage medium 207, which is a memory card, is displayed on the display unit 106, or is output to an external device.

The non-volatile memory 203 stores programs to be executed by the control unit 201 (an OS (operating system), application programs (hereinafter referred to as "applications") that run on the OS, and the like). The non-volatile memory 203 also stores GUI data, various types of setting values, information relating to an external device registered as a communication partner (identification information, encryption keys for communication, etc.), and the like. In the present embodiment, communication between the smartphone 200 and the digital camera 100 is realized through a specific application.

A working memory 204 is used as a display memory (VRAM) for the display unit 206, a work area for when the control unit 201 executes the OS or an application, and the like.

An operation unit 205 is a group of input devices by which the user inputs instructions to the smartphone 200. To give a description with reference to FIG. 2B, which shows an example of the exterior of the smartphone 200, the operation unit 205 includes, for example, a power button 205*a* for giving an instruction to turn on or off the power of the smartphone 200 and a touch panel 205*c* of the display unit 206. Also, the home button 205*b* is a button for interrupting an application being executed and displaying a home screen on which another application can be selected, as shown in FIG. 2B. Other than this, a volume adjustment button, a shutter button, or the like may be included. Note that an input device for recognition, such as an iris sensor or a fingerprint sensor may be included in the operation unit 205, for example.

The display unit 206 is a touch display that displays a GUI screen provided by the OS and various types of information provided by various types of applications.

The storage medium 207 is, for example, a semiconductor memory, and may be removable from the smartphone 200. Data used by applications, still image and moving image data obtained by the image capture unit 202 performing image capture, data received from an external device, and the like can be stored in the storage medium 207.

The communication unit 211 is an interface for communication with an external device and includes, for example, an antenna, a modulation/demodulation circuit, and a communication controller. In the present embodiment, the communication unit 211 performs wireless communication conforming to a wireless LAN standard, similarly to the communication unit 111 of the digital camera 100. Note that the communication between the communication unit 111 and the communication unit 211 may be performed in an ad-hoc mode or in an infrastructure mode. Also, data communication on a wireless LAN can be performed in conformity with PTP/IP (Picture Transfer Protocol over Internet Protocol), but there is no limitation to this.

The short-range wireless communication unit 212 is a communication interface between the smartphone 200 and an external device, and for example, includes an antenna, a modulation/demodulation circuit, and a communication controller. The short-range wireless communication unit 212 performs wireless communication with smaller power consumption, a shorter communication range, and a slower communication speed than the communication unit 211 with the external device. For example, the short-range wireless communication unit 212 performs communication conforming to a BLE standard, similarly to the short-range wireless communication unit 112 of the digital camera 100. Note that it is possible to use a configuration in which the communication unit 211 and the short-range wireless communication unit 212 perform communication conforming to another wireless communication standard.

In order to perform communication through the short-range wireless communication units 112 and 212, it is necessary to perform registration processing, which is called pairing, between the digital camera 100 and the smartphone 200. In pairing, one device operates as a peripheral device and the other device operates as a central device, and each device executes a predetermined procedure. Normally, the device (here, the digital camera 100) that transmits the data operates as the peripheral device. The peripheral device broadcasts an advertising signal including information of the peripheral device and waits for a response from another device that exists in the communicable range. The central device (here, the smartphone 200) discovers the peripheral device by receiving (scanning) the advertising signal, and transmits a connection request signal to the peripheral device. Accordingly, when the peripheral device and the central device enter the connected state, the peripheral device and the central device generate and store identification information for the partner device, which is to be used during re-connection.

Note that although the term "pairing" is sometimes used as a term meaning key generation and exchange processing for encrypted communication, in the present specification, processing for registering an external device as a communication partner in short-range wireless communication is called pairing, regardless of whether or not encryption is present.

A public network connection unit 213 is a communication interface for performing connection with a public wireless communication network in conformity with a standard such as 3G or LTE (Long Term Evolution). The smartphone 200 provides a function of calling a device on the public network via the public network connection unit 213. During a call, the control unit 201 outputs audio input through a microphone 214 to the public network connection unit 213 and outputs an audio signal received through the public network connection unit 213 from a speaker 215. Note that the communication unit 211 and the public network connection unit 213 may share one antenna.

Remote Operation of Digital Camera Using Wireless Communication

Next, operations for realizing remote operation of the digital camera 100 from the smartphone 200 using short-range wireless communication will be described.

Here, functions that can be realized remotely from the smartphone 200 by using short-range wireless communication (BLE) are:
- a function of starting a wireless connection with the digital camera 100 using the communication unit 211 (function of switching from BLE to wireless LAN);
- a function of switching between the power on/off and standby states of the digital camera 100; and
- a remote control function of the digital camera 100 (a function of remotely instructing operations similar to the operations of the operation unit 105).

However, these are merely examples, and other functions can also be realized.

Also, functions that can be realized remotely from the smartphone 200 by using wireless communication (wireless LAN) of the communication unit 211 are:
- an image transfer function of acquiring image data from the digital camera 100; and
- a function of disconnecting a wireless connection with the digital camera 100 performed by the communication unit 211 (a function of switching from wireless LAN to BLE).

However, these are merely examples, and other functions can also be realized.

These various functions are realized through a specific application (a camera control application) that runs on the smartphone 200. FIGS. 3A to 3D are diagrams schematically showing examples of GUI screens provided by the camera control application of the present embodiment.

Figure 3A:
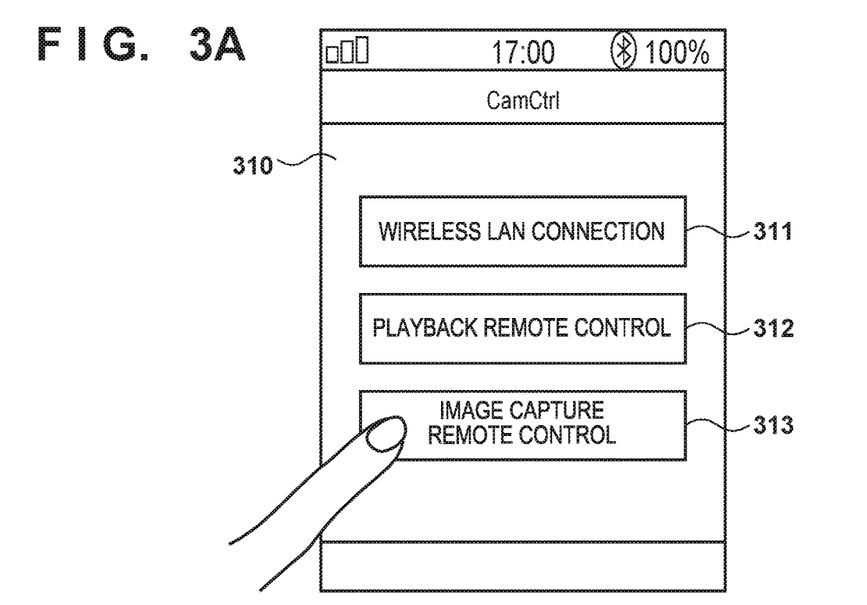
FIGS. 3A to 3D are diagrams showing examples of screens of a camera control application of a smartphone according to an embodiment.
Figure 3B:
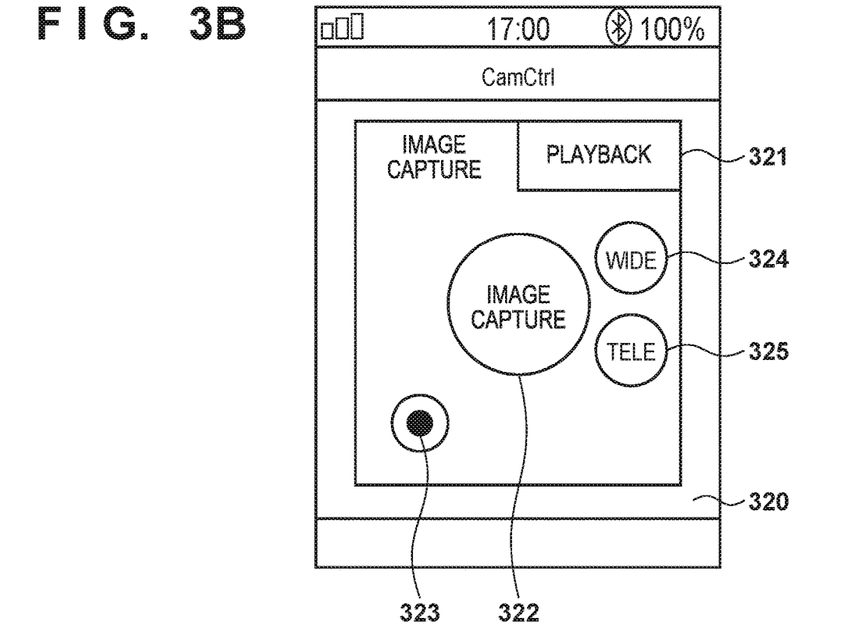
Figure 3C:
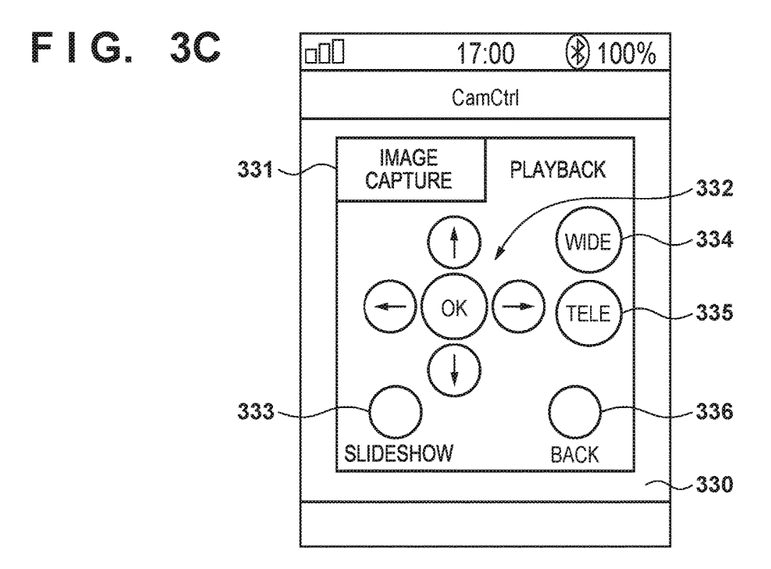
Figure 3D:
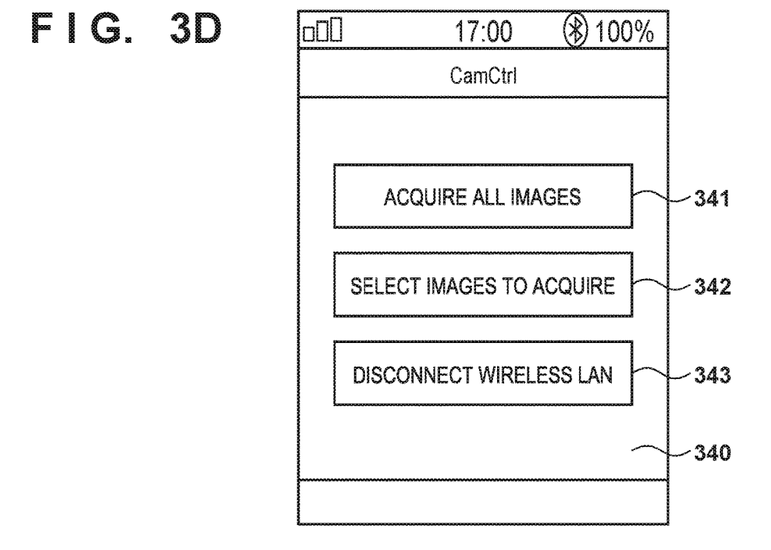

FIG. 3A is an example of an initial screen 310 of the camera control application, for example. The initial screen 310 is a function selection screen in which buttons 311 to 313, which correspond to respective functions, are included. When the wireless LAN connection button 311 is operated (tapped or pressed), the screen shown in FIG. 3D is transitioned to. Also, when a playback remote control button 312 is operated, the screen shown in FIG. 3C is transitioned to. Furthermore, when an image capture remote control button 313 is operated, the screen shown in FIG. 3B is transitioned to. Note that a button for instructing execution of pairing may also be included.

FIG. 3B shows an example of an image capture remote control screen provided in response to an operation of the image capture remote control button 313. In this example, it is possible to perform a still image capture instruction, a moving image capture instruction, and a lens angle changing instruction using the image capture remote control function. The operation of the image capture button 322 corresponds to a full-press operation of the release button of the operation unit 105. An operation of the moving image capture button 323 corresponds to an operation of the moving image capture button of the operation unit 105. Also, operations of the view angle changing buttons 324 and 325 correspond to operations of the view angle changing buttons of the operation unit 105. Upon detecting operations of the GUI buttons, the camera control application (control unit 201) transmits the commands corresponding to the operations to the digital camera 100 through the short-range wireless communication unit 212. Note that when a tab 321 is operated, a transition is made from the image capture remote control screen to the playback remote control screen (FIG. 3C).

FIG. 3C shows an example of a playback remote control screen provided in response to an operation of the playback remote control button 312. In this example, it is possible to perform still image and moving image playback instructions and enlarging/shrinking instructions for an image being played back, using the playback remote control function. The direction buttons and OK button 332 are buttons for selecting and designating an image to be played back from a thumbnail display screen, for example. Also, a shrink button 334 and an enlarge button 335 are buttons for instructing shrinking and enlarging of an image being played back. A slideshow button 333 is a button for performing an instruction similar to instructing slideshow playback from a playback menu, for example. A return button 336 is a button for instructing to return to the list display screen, for example. Operations of these buttons correspond to operations of similar buttons included in the operation unit 105. Upon detecting operations of the GUI buttons, the camera control application (control unit 201) transmits the commands corresponding to the operations to the digital camera 100 through the short-range wireless communication unit 212. Note that when a tab 331 is operated, a transition is made from the playback remote control screen to the image capture remote control screen (FIG. 3B).

A live view image is not displayed with the image capture remote control function and the image being played back is not displayed with the playback remote control function due to the fact that the remote control function is realized using short-range wireless communication, which has a lower speed. Also, since the image capture remote control function does not include functions for changing the shutter speed and aperture, and the like, operation of the operation unit 105 of the digital camera 100 is enabled while the camera control application of the smartphone 200 is providing the image capture remote control function. On the other hand, since the playback remote control function does not necessarily require an operation of the operation unit 105, malfunction may be prevented by disabling operation of the operation unit 105 of the digital camera 100 while the camera control application of the smartphone 200 is providing the image capture remote control function.

Note that there is no particular limitation on the number and type of buttons included on the screens for the image capture remote control function and the playback remote control function, and it is also possible to simply include buttons corresponding to all of the input devices (except for the touch panel) of the operation unit 105. Also, operation of the menu screen of the digital camera 100 may be enabled.

FIG. 3D shows an example of a GUI screen provided in response to an operation of the wireless LAN connection button 311. Note that when the operation of the wireless LAN connection button 311 is detected on the initial screen 310, the camera control application (control unit 201) transmits a wireless LAN connection command to the digital camera 100 through the short-range wireless communication unit 212. Upon detecting reception of the wireless LAN connection command, the sub control unit 116 of the digital camera 100 performs communication necessary to establish wireless LAN connections between the short-range wireless communication units 112 and 212 and the communication units 111 and 211, and thereafter disconnects the connection for short-range wireless communication. Then, the sub control unit 116 establishes a wireless LAN connection between the communication units 111 and 211.

Note that since a known method can be used for the communication performed by the devices and the operations of the devices in order to establish another connection for wireless communication such as wireless LAN using short-range wireless communication such as BLE, a description of the specific procedure will not be included here.

Accordingly, at the time of transitioning to the screen shown in FIG. 3D, the wireless communication between the smartphone 200 and the digital camera 100 switches from BLE to wireless LAN. Alternatively, the control unit 201 displays the screen shown in FIG. 3D after the connection for wireless LAN is established.

FIG. 3D shows an example of a GUI screen relating to a function of acquiring image data from the digital camera 100, which is an example of a function using a wireless LAN connection. An all image acquisition button 341 is a button for instructing transfer of all image files stored in the storage medium 107 of the digital camera 100 to the smartphone 200. Note that here, "transfer" may be "moving" or "copying". The control unit 201 (camera control application) transmits a command requesting information of all image files stored in the storage medium 107 of the digital camera 100 from the communication unit 211 to the digital camera 100. Then, based on the acquired information, the control unit 201 (camera control application) transmits a command requesting the image files to the digital camera 100 and receives the image files. The control unit 201 (camera control application) stores the received image files in the non-volatile memory 203, for example. The control unit 201 (camera control application) sequentially transmits request commands for the image files until all of the image files are received.

A selection button 342 is a button for instructing transfer of only desired image files among those stored in the storage medium 107 of the digital camera 100 to the smartphone 200. When the selection button 342 is operated, a selection screen for allowing a user to select image files is transitioned to. There is no limitation on the style of the selection screen, but it is possible to use a screen including multiple selectable thumbnail images, for example. The control unit 201 (camera control application) transmits a command requesting an image file that corresponds to a thumbnail image selected on the selection screen from the communication unit 211 to the digital camera 100, and receives the image file. The control unit 201 (camera control application) stores the received image files in the non-volatile memory 203, for example.

A disconnection button 343 is a button for instructing disconnection of the wireless LAN connection with the digital camera 100. When the disconnection button 343 is operated, the control unit 201 (camera control application) transmits a disconnection request command to the digital camera 100 through the communication unit 211 and causes a transition to the initial screen (FIG. 3A). With the digital camera 100, the control unit 101 controls the communication unit 111 and executes a procedure for disconnecting the connection of the wireless LAN. Then, the sub control unit 116 transmits the advertising signal designating the smartphone 200, for example, from the short-range wireless communication unit 112, and starts the procedure for re-connecting short-range wireless communication with the smartphone 200. The control unit 201 (camera control application) controls the short-range wireless communication unit 212 to cause the connection request signal to be transmitted to the digital camera 100 and re-connects the short-range wireless communication.

Note that functions using the wireless LAN communication can be used without hindrance even when the digital camera cannot be seen, as with the case where the digital camera 100 is located inside of a bag, for example. Also, if, for example, the operation unit 105 of the digital camera 100 is operated by another user or operated erroneously while the image files are being transferred, there is a possibility that the transfer will end abnormally. For this reason, if a connection for a wireless LAN is established with an external device, the control unit 101 can disable operation of the operation unit 105.

Figure 4A:
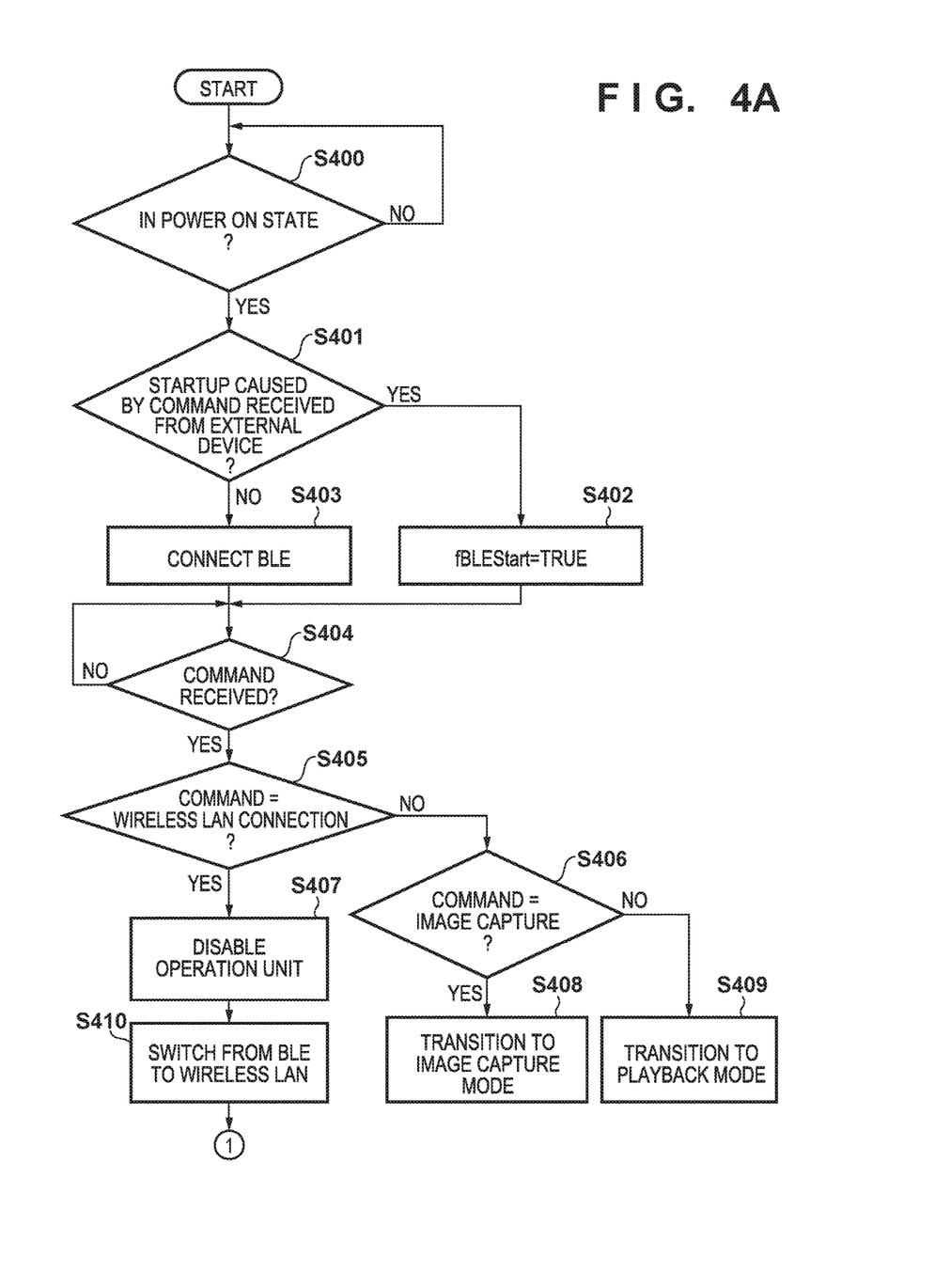
FIGS. 4A and 4B are flowcharts relating to operation of a digital camera according to an embodiment.
Figure 4B:
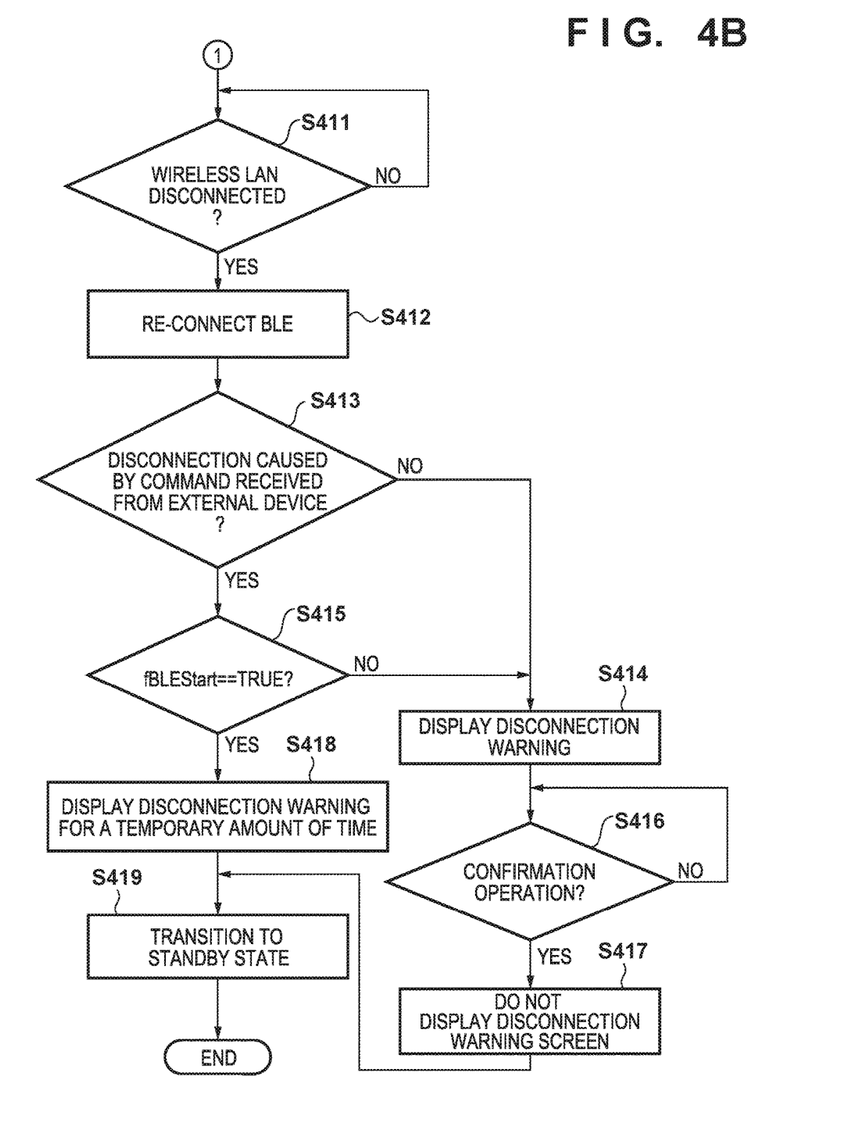

FIGS. 4A and 4B are flowcharts relating to operations relating to linking with an external device, among the operations of the digital camera 100. The operations shown in FIGS. 4A and 4B are started when the digital camera 100 is in the power off state or the standby state.

In step S400, the control unit 101 stands by until it is detected that the digital camera 100 has started up (entered the power on state). Upon detecting that the digital camera 100 has started up, in step S401, the control unit 101 determines whether or not the cause of startup is a startup command received from an external device through the short-range wireless communication unit 112. The sub control unit 116 changes the value of a flag that can be referenced by the control unit 101, according to whether or not the startup command was received. Accordingly, the control unit 101 can determine whether the cause of startup is reception of a startup command or another cause (e.g., operation of the operation unit 105) by referencing the value of the flag.

If it is determined that the cause of startup is reception of a startup command from the external device, the control unit 101 sets a flag fBLEStart to a true value (e.g., 1) in step S402, and thereafter the processing proceeds to step S404. On the other hand, if it is not determined that the cause of startup is reception of a startup command from the external device, the control unit 101 moves to the processing of step S403 without setting fBLEStart to a true value (e.g., leaves the value set to 0). Note that if the value of the flag of the sub control unit 116 indicating whether or not a startup command was received is held until the standby state or the power off state is entered, the processing of steps S401 and S402 need not be performed.

In step S403, the communication unit 101 establishes a connection for short-range wireless communication with the smartphone 200 through the short-range wireless communication unit 112. Note that in the case of starting up from the standby state, step S403 need not be executed since the connection for short-range wireless communication has been established.

In step S404, the control unit 101 stands by for a command from the smartphone 200 through the short-range wireless communication unit 112, and upon receiving a command, the processing moves to the step S405.

In step S405, the control unit 101 determines whether or not the command received from the smartphone 200 is a wireless LAN connection command, and if it is determined that it is a wireless LAN command, the processing moves to step S407, and if not, the processing moves to step S406.

In step S406, the control unit 101 determines whether or not the command received from the smartphone 200 is a command relating to image capture, and if it is determined that it is a command relating to image capture, the processing moves to step S408, and if not, the processing moves to step S409.

In step S408, the control unit 101 causes the digital camera 100 to transition to the image capture mode (if necessary) and executes operations corresponding to the received command.

In step S409, the control unit 101 causes the digital camera 100 to transition to the playback mode (if necessary) and executes operations corresponding to the received command.

Hereinafter, in the image capture mode and the playback mode, the control unit 101 executes operations corresponding to the command received from the smartphone 200. Note that the control unit 101 can perform switching between the playback mode and the image capture mode according to a notification of screen transition from the camera control application of the smartphone 200, and can return the processing to step S404. For example, if notification of a transition to the initial screen 310 is performed, the control unit 101 returns the processing to step S404.

If it is determined that a wireless LAN connection command was received in step S405, the control unit 101 disables operation of the operation unit 105 in step S407.

Then, in step S410, the control unit 101 switches the connection with the smartphone 200 from a short-range wireless connection to a wireless LAN connection. For example, the control unit 101 instructs the sub control unit 116 to disconnect the connection with the smartphone 200 through the short-range wireless communication unit 112. Also, the control unit 101 establishes a connection with the smartphone 200 through the communication unit 111. The control unit 101 may acquire the information needed for establishing the wireless LAN connection from the smartphone 200 using short-range wireless communication before performing disconnection. Note that here, the communication unit 111 and the short-range wireless communication unit 112 are caused to operate exclusively, but if communication interference, power consumption, and the like are not problematic, the connection for short-range wireless communication need not be disconnected.

When the connection using the communication unit 111 is established, the control unit 101 executes operations (including disconnection of the wireless LAN connection) corresponding to commands received from the smartphone 200 through the communication unit 111. Here, for the sake of convenience, description of details of operations for the commands is not included. Also, when the connection performed by the communication unit 111 is established, the control unit 101 thereafter monitors whether or not the connection for the wireless LAN was disconnected (step S411), and if it is determined that the wireless LAN connection was disconnected, the processing moves to step S412.

In step S412, the communication unit 101 instructs the sub control unit 116 to re-connect with the smartphone 200 through the short-range wireless communication unit 112. The sub control unit 116 executes processing for re-connection of the short-range wireless communication with the smartphone 200 in response to this instruction.

In step S413, the control unit 101 determines whether or not the disconnection of the wireless LAN connection was caused by reception of a disconnection command from an external device (smartphone 200). Then, if it is determined that the disconnection was caused by reception of a disconnection command, the control unit 101 moves the processing to step S415, and if not, the control unit 101 moves the processing to step S414. Examples of causes of disconnection other than reception of a disconnection command include deterioration of the radio wave state and an abnormal end of the camera control application in the smartphone 200.

In step S415, the control unit 101 determines whether or not the flag fBLEStart is a true value (whether or not the latest startup was caused by a command received from the external device), and if it is determined that the flag fBLEStart is a true value, the processing moves to step S418, and if not, the processing moves to step S414. Note that as described above, the control unit 101 may determine in step S415 whether or not the latest startup was caused by a command received from the external device by referencing the flag of the sub control unit 116, which indicates whether or not a startup command was received, without executing steps S401 and S402.

In steps S414 and S418, on the display unit 106, the control unit 101 displays a warning screen indicating that the wireless LAN connection was disconnected. Here, the control unit 101 changes the display style or display method of the warning screen according to whether or not the latest startup was caused by a command received from the external device.

Figure 5A:
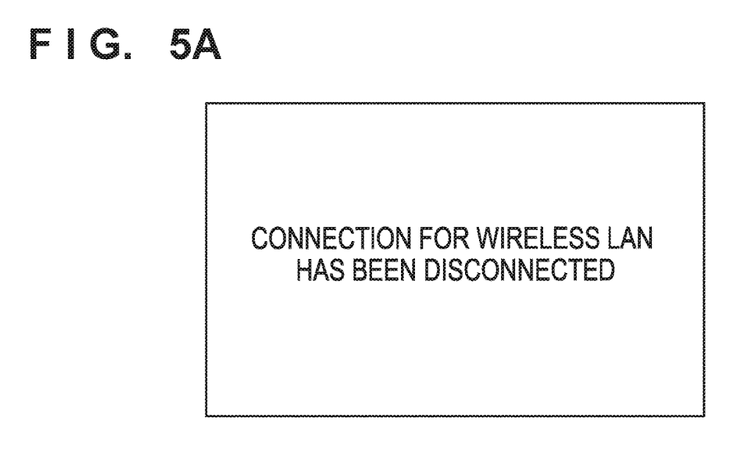
FIGS. 5A and 5B are diagrams showing examples of a warning screen displayed by a digital camera when a connection is disconnected.
Figure 5B:
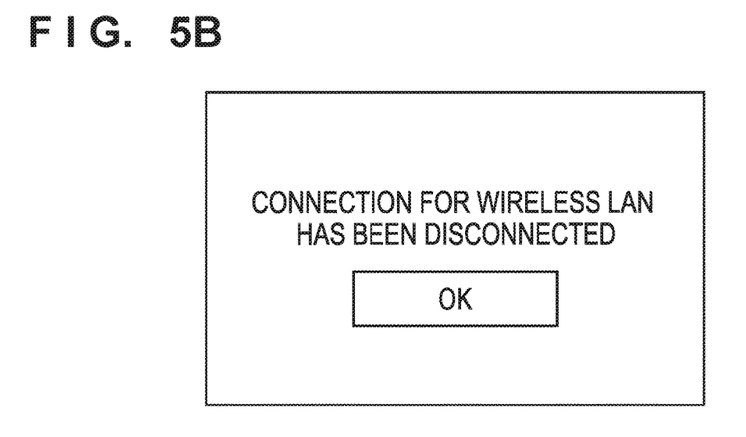

If it is determined that the latest startup was caused by a command received from the external device, in step S418, the control unit 101 displays the warning screen shown in FIG. 5A for a predetermined amount of time, for example, whereafter the screen display ends, and the processing moves to step S419. On the other hand, if it is not determined that the latest startup was caused by a command received from the external device, in step S414, the control unit 101 displays a warning screen requesting user confirmation (operation of an OK button or operation of the operation unit 105), as shown in FIG. 5B for example. Then, in step S416, the control unit 101 stands by for a user confirmation operation and continues displaying the warning screen. When the user confirmation operation is detected in step S416, the control unit 101 moves the processing to step S417, ends display of the warning screen, and moves the processing to step S419.

In step S419, the control unit 101 causes the digital camera 100 to transition to the standby state and ends the processing.

Figure 6:
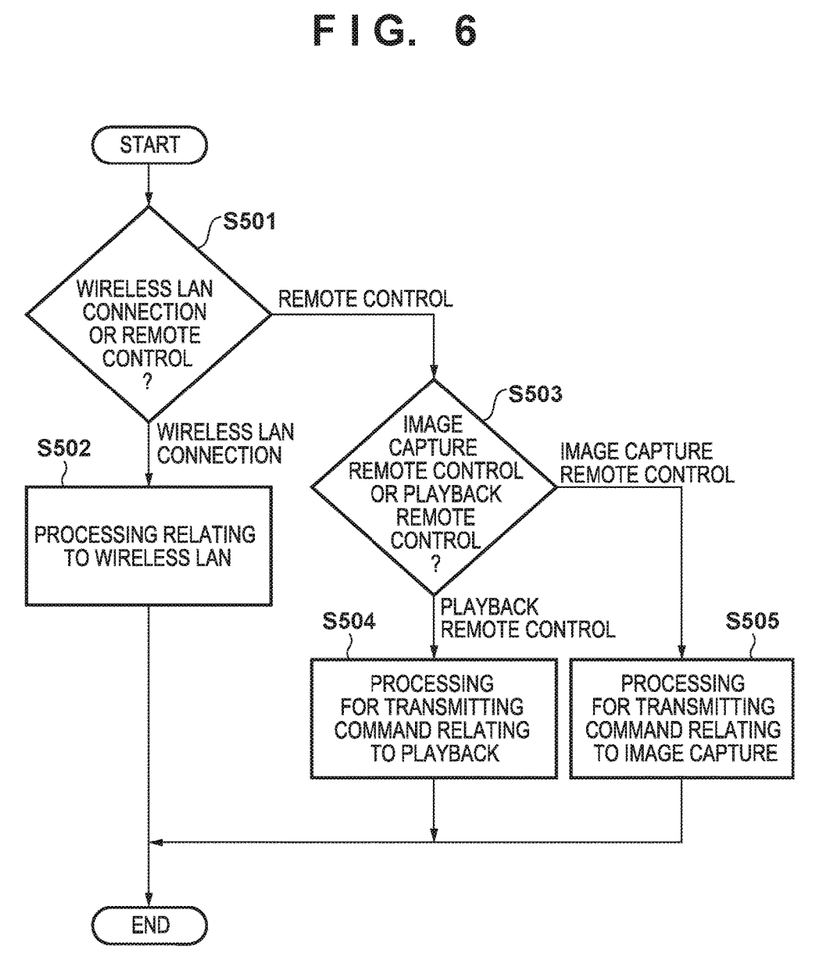
FIG. 6 is a flowchart relating to operation of a smartphone according to an embodiment.

FIG. 6 is a flowchart relating to operations performed by the smartphone 200 according to the present embodiment.

The operations shown in FIG. 6 are started in a state in which a communication connection between the short-range wireless communication unit 112 of the digital camera 100 and the short-range wireless communication unit 212 of the smartphone 200 has been established, the camera control application has been started up, and the initial screen 310 (FIG. 3A) is displayed.

In step S501, the control unit 201 causes the processing to diverge according to the button operated on the initial screen 310 shown in FIG. 3A. If the wireless LAN connection button 311 was operated (tapped or pressed), the control unit 201 moves the processing to step S502, and if the playback remote control button 312 or the image capture remote control button 313 was operated, the control unit 201 moves the processing to step S503.

In step S502, the control unit 201 displays the selection screen 340 shown in FIG. 3D on the display unit 206. Then, the control unit 201 executes pre-determined processing corresponding to the button operated on the selection screen 340, and uses the wireless LAN connection to acquire image files from the digital camera 100 or execute disconnection of the wireless LAN connection.

In step S503, if the playback remote control button 312 was operated, the control unit 201 moves the processing to step S504, and if the image capture remote control button 313 was operated, the control unit 201 moves the processing to step S505.

In step S504, the control unit 201 displays the playback remote control screen 330 shown in FIG. 3C on the display unit 206 and transmits commands corresponding to the buttons operated on the playback remote control screen 330 to the digital camera 100 through the short-range wireless communication unit 212.

In step S505, the control unit 201 displays the image capture remote control screen 320 shown in FIG. 3B on the display unit 206 and transmits commands corresponding to the buttons operated on the image capture remote control screen 320 to the digital camera 100 through the short-range wireless communication unit 212.

As described above, according to the present embodiment, if the wireless connection with the external device is disconnected, the display style or display method of the warning screen is changed according to the cause of the disconnection. For example, a decrease in power consumption and an improvement in user-friendliness can be achieved by causing the display of the warning screen to automatically end if disconnection occurs due to a request from the external device. Also, if disconnection occurs due to a cause other than a request from the external device, it is possible to reliably indicate to the user that disconnection has occurred due to deterioration of the radio wave state or the like by continuing to display the warning screen until user confirmation is detected.

Other Embodiments

The above-described embodiment described an electronic device that has multiple wireless communication units and switches the wireless communication unit to be used according to the application. However, in the present invention, the switching of the wireless communication unit is not an essential configuration, and it is also possible to use a configuration in which the method for displaying the disconnection warning screen is changed according to whether or not the disconnection of the wireless connection with the external device is based on a request from the external device in an electronic device having one wireless communication unit.

Also, if the disconnection of the wireless connection with the external device is based on a request from the external device, it is possible to cause the display of the warning screen to end automatically, regardless of whether or not the cause of startup was a startup command received from the external device. This is because it is thought that if the disconnection of the wireless connection with the external device is based on a request from the external device, there is a low likelihood that disconnection occurred contrary to the user's intention and confirmation need not be obtained (in particular, this is a case in which operation of the operation unit is disabled when the wireless connection is established).

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-170065, filed on Aug. 31, 2016, which is hereby incorporated by reference herein in its entirety.

What is claimed is:

1. An electronic device comprising:
at least one processor; a first wireless communication interface coupled to the at least one processor;
wherein the at least one processor is configured to function as following units:
a first determination unit configured to, if a connection with an external device through the first wireless communication interface is disconnected, determine whether or not a disconnection is based on a request from the external device; and
a display control unit configured to control displaying a warning screen for indicating the disconnection on a display unit,
wherein in a case in which the first determination unit determines that the disconnection is based on the request from the external device, the display control unit causes display of the warning screen to be maintained for a predetermined amount of time and then automatically ended, and
wherein in a case in which the first determination unit does not determine that the disconnection is based on the request from the external device, the display control unit causes display of the warning screen to be maintained until a confirmation operation of a user is detected, and to be ended upon detection of the confirmation operation.

2. The electronic device according to claim 1, the at least one processor further functions as
a second determination unit configured to determine whether or not a latest startup of the electronic device is caused by the external device,
wherein
in a case in which the first determination unit determines that the disconnection is based on the request from the external device and the second determination unit determines that the latest startup of the electronic device is caused by the external device, the display control unit causes display of the warning screen to be maintained for a predetermined amount of time and then automatically ended, and
in a case in which either the first determination unit does not determine that the disconnection is based on the request from the external device or the second determination unit does not determine that the latest startup of the electronic device is caused by the external device, the display control unit causes display of the warning screen to be maintained until a confirmation operation of a user is detected, and to be ended upon detection of the confirmation operation.

3. The electronic device according to claim 2, further comprising
a second wireless communication interface,
wherein the latest startup is a result of a reception of a command from the external device by the second wireless communication interface.

4. The electronic device according to claim 3, wherein
the second wireless communication interface has smaller power consumption and a slower communication speed than the first wireless communication interface.

5. The electronic device according to claim 3, wherein
in a standby state of the electronic device, the second wireless communication interface can communicate with the external device and power is not supplied to the first wireless interface.

6. The electronic device according to claim 3, wherein
communication with the external device by the first wireless communication interface starts in response to a reception of the command from the external device by the second wireless communication interface.

7. The electronic device according to claim 3, wherein
the second wireless communication interface is not used while the first wireless communication interface is being used to communicate with the external device.

8. A control method for an electronic device having a wireless communication unit, the method comprising:
determining, in a case where a connection with an external device performed by the wireless communication unit is disconnected, whether or not a disconnection is based on a request from the external device; and
controlling display of a warning screen indicating the disconnection on a display apparatus,
wherein in a case in which the determining determines that the disconnection is based on the request from the external device, the controlling causes display of the warning screen to be maintained for a predetermined amount of time and then automatically ended, and in a case in which the determining does not determine that the disconnection is based on the request from the external device, the controlling causes display of the warning screen to be maintained until a confirmation operation of a user is detected and to be ended upon detection of the confirmation operation.

9. A non-transitory computer-readable medium storing a program for causing, when executed by a computer that is included in an electronic device having a first wireless communication unit, the computer to function as:
a first determination unit configured to, if a connection with an external device through the first wireless communication interface is disconnected, determine whether or not a disconnection is based on a request from the external device; and
a display control unit configured to control displaying a warning screen for indicating the disconnection on a display unit,
wherein in a case in which the first determination unit determines that the disconnection is based on the request from the external device, the display control unit causes display of the warning screen to be maintained for a predetermined amount of time and then automatically ended, and
wherein in a case in which the first determination unit does not determine that the disconnection is based on the request from the external device, the display control unit causes display of the warning screen to be maintained until a confirmation operation of a user is detected, and to be ended upon detection of the confirmation operation.

* * * * *